No. 885,841. PATENTED APR. 28, 1908.
M. DAVIS.
GRAIN WEIGHING AND BAGGING MACHINE.
APPLICATION FILED MAY 28, 1907.

3 SHEETS—SHEET 1.

Witnesses
Frank R. Glore
H. C. Rodgers

Inventor
Monroe Davis.
By George H. Thorpe Atty.

No. 885,841. PATENTED APR. 28, 1908.
M. DAVIS.
GRAIN WEIGHING AND BAGGING MACHINE.
APPLICATION FILED MAY 28, 1907.

3 SHEETS—SHEET 2.

Witnesses
Frank R. Glore
H. C. Rodgers

Inventor
Monroe Davis
By George H. Thorpe
Atty.

No. 885,841. PATENTED APR. 28, 1908.
M. DAVIS.
GRAIN WEIGHING AND BAGGING MACHINE.
APPLICATION FILED MAY 28, 1907.
3 SHEETS—SHEET 3.
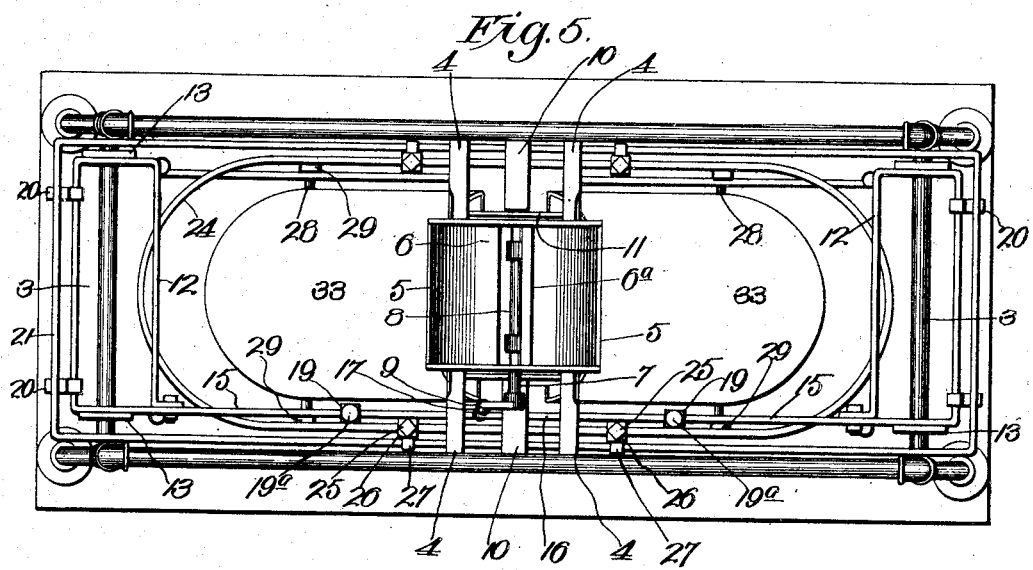
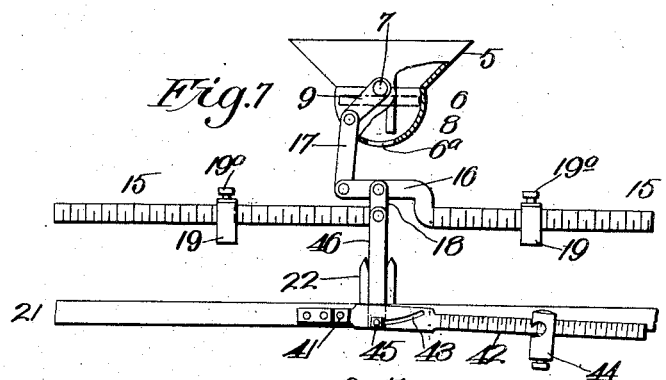
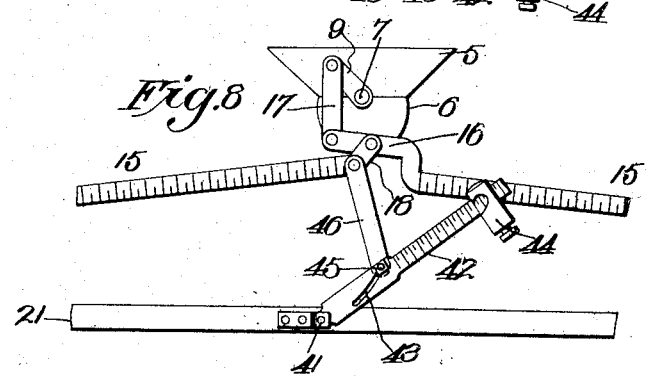
Witnesses
Frank R Glore
H. C. Rodger
Inventor
Monroe Davis
By George H. Thopp
Atty.

UNITED STATES PATENT OFFICE.

MONROE DAVIS, OF TONKAWA, OKLAHOMA, ASSIGNOR OF ONE-HALF TO O. W. HUTCHISON, OF TONKAWA, OKLAHOMA.

GRAIN WEIGHING AND BAGGING MACHINE.

No. 885,841.　　　Specification of Letters Patent.　　　Patented April 28, 1908.

Application filed May 28, 1907. Serial No. 376,158.

*To all whom it may concern:*

Be it known that I, MONROE DAVIS, a citizen of the United States, residing at Tonkawa, in the county of Kay, and State of Oklahoma, have invented certain new and useful Improvements in Grain Weighing and Bagging Machines, of which the following is a specification.

This invention relates to grain weighing and bagging machines and one of my objects is to produce a machine for charging a sack or receptacle until it contains grain to a predetermined weight and then automatically divert the supply of grain into a second sack or receptacle until the grain therein also attains a predetermined weight and then automatically cut off the flow of grain.

Another object is to produce a machine of the character mentioned whereby the removal of the first-named sack results in again starting the flow of grain into the second sack and then cuts off such supply when said sack is charged to the required weight.

Another object of the invention is to produce means for manually cutting off the supply of grain at any time or for varying the volume of such supply.

A still further object is to produce automatic means for insuring accuracy in the weighing operation by more rapidly cutting off the supply of grain.

Another object is to produce a grain weighing and bagging machine of small and compact construction to permit the weighing and bagging operations to be performed in a grain car or other place where space is limited.

With these and other objects in view as hereinafter appear, the invention consists in certain novel and peculiar features of construction and organization as hereinafter described and claimed; and in order that it may be fully understood reference is to be had to the accompanying drawings, in which—

Figure 1:
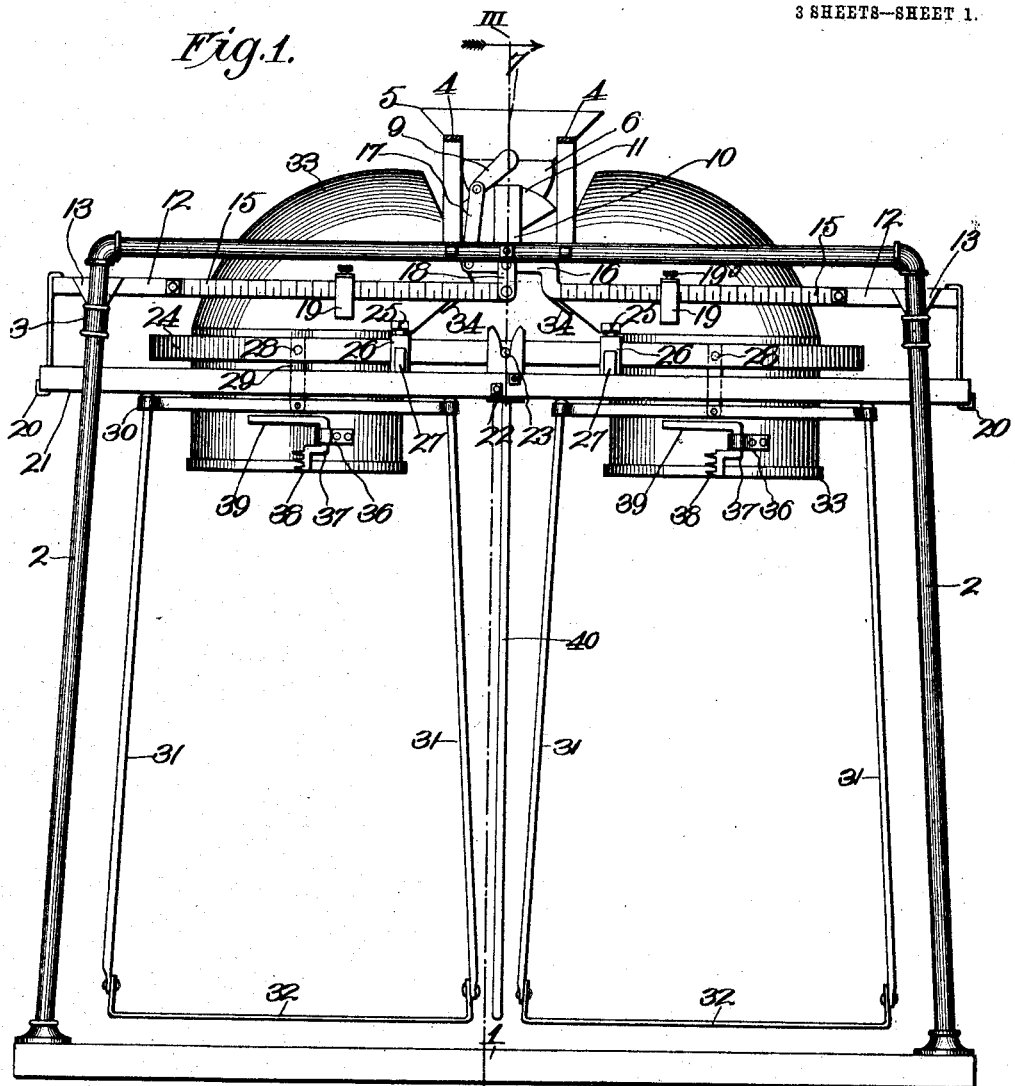
Figure 6:
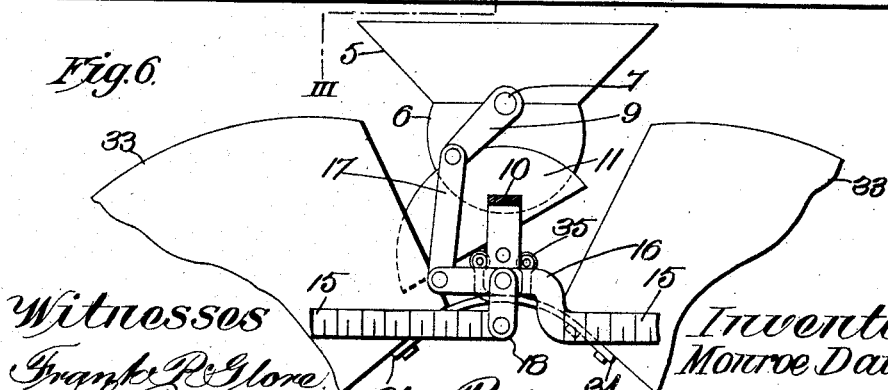
Figure 2:
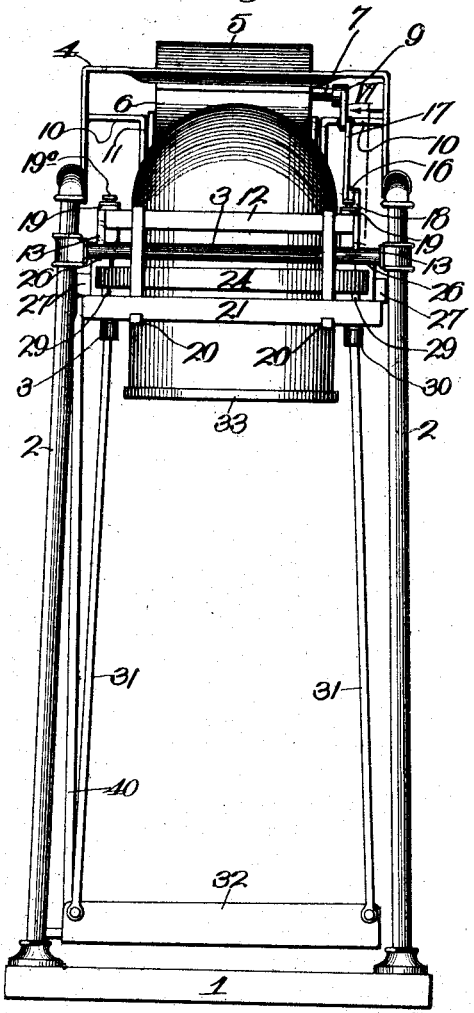
Figure 3:
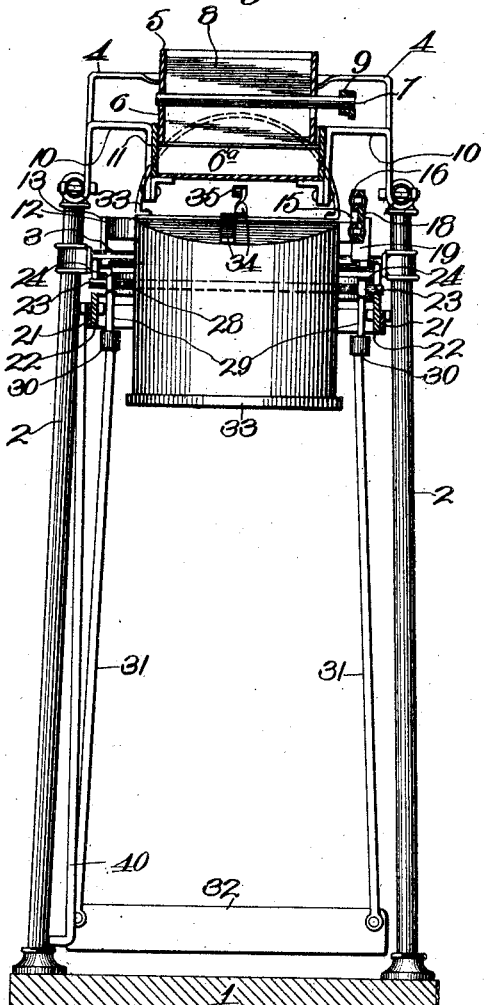
Figure 4:
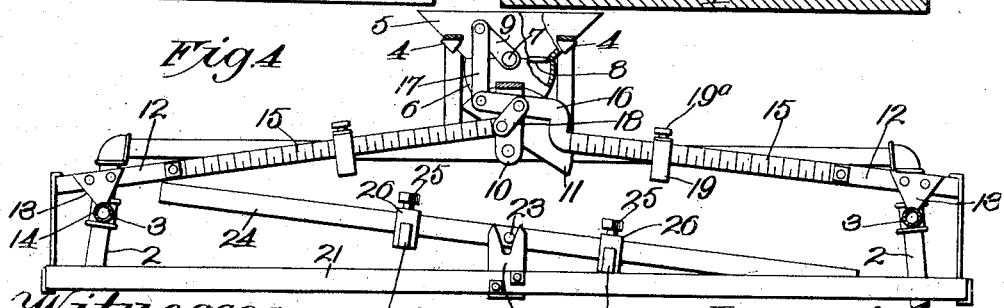

Figure 1, is a side elevation of a grain weighing and bagging machine embodying my invention. Fig. 2, is an end view of the same. Fig. 3 is a vertical section on the line III—III of Fig. 1. Fig. 4, is a side view of a part of the machine with certain parts omitted and with those shown in the position they occupy just after one sack has been charged to the predetermined weight. Fig. 5, is a top plan view of the machine. Fig. 6, is an enlarged side view of a part of the machine, with a bracket forming part of it in vertical section. Fig. 7, is a side view of a part of a grain weighing and bagging machine of modified construction. Fig. 8, is a similar view with certain of the parts occupying different positions.

In the said drawings, a frame comprises a substantially oblong rectangular base 1, a pair of inverted-U shaped frames mounted upon the base near its front and rear edges and cross bars 3 connecting said frames near their upper corners, said frames 2 and cross bars 3 being preferably of gas pipe.

4 indicates a pair of inverted U-shaped frames mounted upon the bridging portions of frames 2, and 5 is a hopper mounted upon and between frames 4 and provided with a semi-cylindrical bottom 6, having a central slot or discharge opening $6^a$.

Journaled in the hopper and extending through the same at its junction with the bottom 6, is a shaft 7 and secured rigidly on said shaft is a valve 8 which when closed is disposed horizontally so as to cut off communication between the top and bottom portions of the hopper. When the valve is open it occupies a vertical position and the grain is free to flow through the hopper and pass out through the discharge opening $6^a$. A crank arm 9 is secured on the front end of shaft 7 for a purpose which hereinafter appears.

10 indicates U-shaped frames arranged centrally between frames at the front and rear sides of the hopper and pivoted to and between said frames 10 is a tiltable chute 11, of U-shape when viewed from the end of the machine, with its arms or flanges interposed between frames 10 and the lower portion of the bottom of the hopper to compel the grain escaping through the opening $6^a$ to drop vertically down upon the bottom of the chute and be discharged thereby from its lower or depressed end.

12 indicates a pair of oblong rectangular frames provided with depending arms 13 terminating in points 14 fitting pivotally in cross bars 3, as shown in Fig. 4, or otherwise pivotally mounted, and projecting from the front ends of frames 12 are inwardly projecting poise beams 15, the inner end of one of said beams being bent as at 16 to overhang the other and of greater length than the latter, the inner end of said prolonged beam being pivotally connected by link 17 with crank arm 9. The inner end of the companion beam 15 is pivotally connected by a link 18 with the overlying portion 16 of the companion beam, and mounted adjustably on said beams which are adapted to contain graduated scale markings, not shown, are adjustable poise 19, suitable means such as set screws 19$^a$ being employed to secure the poise reliably at the point desired.

20 indicate hooks depending from the outer ends of the scale-beams and engaging the ends of and supporting a rectangular frame 21 provided centrally of its front and rear sides with upwardly projecting bifurcated bearing plates 22 to receive the central guide pins 23 of a substantially oblong rectangular rock frame 24 (capable of swinging as indicated in Fig. 4,) and secured by set screws 25 upon the sides of the rock frame are slides 26 provided with bearing arms 27 to rest upon frame 21 when the rock frame occupies a horizontal position and adapted for alternately forming fulcrum points for said rock frame.

28 indicates pivot rods extending across frame 24 at opposite sides of and equal distances from its center and pivotally suspended from said pivot rods are links 29 pivotally connecting bars 30 from which depend rods 31 attached at their lower ends to platforms 32, as rests or supports for the grain-receiving receptacles, not shown,—preferably such receptacles will be in the form of sacks with their upper ends distended by and fitting around the lower or discharge ends of a pair of substantially quadrant-shaped tubes 33 arranged within frame 24 near its opposite ends and pivotally mounted on rods 28 carried by said frame. Said quadrant-shaped tubes have their upper ends converging upwardly with respect to each other and are so disposed that the corresponding ends of the chute may enter them though never at the same time.

Secured to and carried by said tubes are brackets 34 equipped at their upper ends and between the tubes with anti-friction rollers 35, the roller 35 supported from each tube being disposed at the opposite side of the pivotal point of the chute 11 from said tube, as shown clearly in Fig. 6.

36 indicates brackets secured to the front and rear sides of tubes 33, and 37 vertical rock bars journaled in said brackets and provided at their lower ends with pronged cranks 38 and at their upper ends with handles 39, the handles being utilized for turning the rock bars and causing their pronged cranks to reliably engage or grip the upper ends of the sacks to secure the same reliably to the tubes and distended by the latter.

40 indicates a foot rod depending centrally by preference from one side of frame 21 so that the operator may pull downward on said rod by hand or foot for the purpose of lowering said frame and cutting off the supply of grain as hereinafter explained.

Assuming that a sack is suspended from the lower end of each tube 33 and understanding that the valve is open when the parts are arranged as shown most clearly in Fig. 1, it will be seen that grain permitted to flow into the hopper will pass through the same onto chute 11 and be deflected by the latter into the left hand tube 33 and thence falls into the sack suspended therefrom. When grain to a predetermined weight has entered the sack, it will cause the rock frame 24 to rock with the left hand bearing arms 27 as the fulcrum, the pin 23 riding upward in the bifurcations of brackets 22 to make the frame incapable of creepage or movement other than pivotal movement on frame 21. As the rock frame thus operates the left-hand tube moves downward and the right hand tube upward, said upward movement of said right hand tube through the instrumentality of its bracket 34 and roller 35, rocking the chute 11 so that its originally depressed end shall be withdrawn from the left hand tube 33 and its originally elevated end shall be depressed into the right hand tube 33 and thus automatically deflect or divert the grain flowing through the hopper into the right hand tube and into the sack suspended therefrom. In Fig. 4 the parts are shown in the positions they occupy as the position of the tiltable chute is reversed, the tubes being omitted from said figure for the sake of clearness.

When said sack becomes charged to a predetermined weight—which is only a fraction of the weight of the grain in the first-named sack,—the weight of the last-named sack is counterbalanced because the second sack has the advantage of leverage in that the left hand bearing arms 27 are forming the fulcrum. The combined weight of the balanced or charged and partially charged sacks overcomes the resistance offered by the poise 19 and pulls frame 21 downward, the downward movement of frame 21 through the instrumentality of hooks 20, rocking the scale-beams and causing their inner ends to move upward and swing the valve from opened to closed position and thus cut off the supply of grain through the hopper. It will thus be seen that when the sacks are properly placed in position and the machine is started in operation one of said sacks will become charged to the required weight and the other to a predetermined weight less than that of the first one and that the supply will then be cut off so that there will be no danger of a sack being filled to overflowing. It will also be apparent in this connection that the supply of grain could have been cut off before by effecting the depression or downward movement of frame 21 by applying foot pressure on rod 40, or otherwise. It will be noticed that most of the weight of the sacks is sustained by the underlying platforms to prevent injury to or tearing of the sacks at the points where engaged by the prongs and said platforms as hereinafter explained, may also be employed as a support for any object to be weighed. When ready the operator removes the weighed sack and replaces it with another to be filled, the counterbalancing or partially filled sack rerocks frame 24 back until both sets of bearing arms 27 rest upon frame 21, the last-named frame at the same time being elevated by the scale-beams, the downward movement of the inner ends of the latter reopening the valve and permitting the grain to again start flowing into the partially filled sack. When said sack becomes filled to the required weight the actions previously described with respect to the previously weighed sack are repeated,—all future operations being repetitions of those described.

The machine can be adjusted for automatic operation by any weight—within its capacity—desired and the proportion of weight imposed at one side or the other may be varied by varying the positions of the bearing slides 26 forming the fulcrums. The adjustment of the poises on the scale-beams will take place as in any weighing machine having a poise. If desired the machine can be used as an ordinary platform scale by disconnecting link 17 and sliding poise 19 to the desired point on the scale-beams. It will thus be seen that weight imposed on either platform will cause rock frames 21 and 24 to move downward, the former through hooks 20, actuating the scale-beams, it being understood of course that when the poises 19 are placed at the outer ends of their beams the beam balances the weight of frames 21 and 24 and the parts suspended therefrom.

In Figs. 7 and 8, I show the machine as equipped with means for insuring greater accuracy in the weighing operation, that is to say with means for more quickly cutting off the supply of grain after the weighing operation is completed. In said figures the rock frame 24 is not shown but it is to be understood that it will be employed, and pivoted at 41 to frame 21 is a beam 42, provided with a slot 43, and an adjustable poise 44. 45 is a bolt extending slidingly through slot 43 and pivoted at its lower end to said bolt and at its upper end to the pivotal point of connection of link 18 with the underlying scale beam 15 is a link 46. In practice as the scale beam moves upward the link 46 swings upward and to one side or toward the poise so as to obtain more leverage thereon. This movement of the link acts, through the scale-beams and connections—to operate crank 9 and hence the valve so as to close the latter more quickly. The equipment of the scale with this movable platform gives practically the same effect as though extra weight has been placed upon the scales.

By reference particularly to Fig. 7, it will be seen that the valve shaft is above and eccentric of the axis of the semi-cylindrical bottom of the hopper and that when the valve is horizontal as shown by dotted lines, it almost touches the opposite sides of the neck of the hopper, viz. the contracted portion at the junction of the top or flaring portion and the bottom or semi-cylindrical portion thereof, and it will be further understood that as said valve opens the passage of grain to opening $6^a$ is gradually enlarged and that when the valve is eventually arrested in a vertical position its lower edge is a distance above the exit opening $6^a$ equal to the distance between the axis of such semi-cylindrical bottom and the valve.

From the above description it will be apparent that I have produced a grain weighing and bagging machine possessing the features of advantage enumerated as desirable and I wish it to be understood that I do not desire to be restricted to the exact details of construction shown and described as obvious modifications will suggest themselves to one skilled in the art.

Having thus described the invention what I claim as new and desire to secure by Letters-Patent, is:—

1. In a machine of the character described, a framework, scale-beams pivoted thereon, a frame suspended from the scale-beams, a second frame supported by the frame carried by said beams, and platforms suspended from said second frame.

2. In a machine of the character described, a suitable framework, scale-beams pivoted thereon and pivotally linked together at their inner ends, a frame suspended from the outer ends of the scale-beams, a second frame supported on the first-named frame, and platforms suspended from said second frame.

3. In a machine of the character described, a framework comprising a base, a pair of inverted-U frames thereon and cross bars connecting said U-frames, a pair of scale-beams pivoted near their outer ends on said cross bars, a frame supported from the outer ends of the scale-beams, a second frame carried by the first-named frame, and means suspended from the second frame at opposite sides of its center, for supporting an article to be weighed.

4. In a machine of the character described, a framework comprising a base, a pair of inverted-U frames thereon and cross bars connecting said U-frames, a pair of scale-beams pivoted near their outer ends on said cross bars, a frame supported from the outer ends of the scale-beams, a second frame carried by the first-named frame, and platforms pivotally suspended from the second frame at opposite sides of its center.

5. In a machine of the character described, a framework, scale-beams pivoted thereon, a frame supported therefrom, a second frame pivoted on the first, and tubes carried by the second frame and adapted to form supports for the articles to be weighed.

6. In a machine of the character described, a framework, scale-beams pivoted thereon, a frame supported therefrom, a second frame pivoted on the first, tubes carried by the second frame, and platforms supported from said second frame below said tubes.

7. In a machine of the character described, a framework, scale-beams pivoted thereon, a frame supported therefrom, a second frame pivoted on the first, tubes carried by the second frame, platforms supported from said second frame below said tubes, and means for clamping sacks embracing the lower ends of the tubes to the latter.

8. In a machine of the character described, a framework, scale-beams pivoted thereon, a frame supported therefrom, a second frame pivoted on the first, tubes carried by the second frame and adapted to form supports for the articles to be weighed, and a tiltable chute inclined downward toward and projecting at one end into one of said tubes.

9. In a machine of the character described, a framework, scale-beams pivoted thereon, a frame supported therefrom, a second frame pivoted on the first, tubes carried by the second frame and adapted to form supports for the articles to be weighed, a tiltable chute inclined downward toward and projecting at one end into one of said tubes, and means actuated by the upward movement of the tube into which the chute is not projecting for tilting the chute so as to cause its originally elevated end to be depressed below the other and projected into the upwardly moving tube.

10. In a machine of the character described, a suitable framework, scale-beams pivoted thereon, a frame supported from the outer ends of the scale-beams, a second frame provided with bearing arms at opposite sides of its center and resting on the first-named frame and adapted to alternately form fulcrum points for the second frame, and tubes pivotally supported by the second frame outward of said bearing arms.

11. In a machine of the character described, a suitable framework, scale-beams pivotally mounted thereon and having their inner ends linked together, a frame supported from the outer ends of the scale-beams and provided centrally with upwardly projecting bearing plates, a frame having guide pins engaging such bearing plates and movable with respect thereto, bearing arms movable upon the second frame and resting on the first at opposite sides of said bearing plates, substantially-quadrant shaped tubes pivotally carried by the second frame, platforms pivotally suspended from the second frame, a hopper between the tubes and provided with a valve having a crank arm linked to the inner end of one of the scale-beams, a tiltable chute underlying the hopper and supported from the framework and adapted to assume inclined positions with its lower end projecting into one of the tubes or the other, and means carried by each tube and disposed below the chute, at the side of the pivotal point of the same opposite from its respective tube.

12. In a machine of the character described, a hopper comprising a flaring top portion, and a substantially semi-cylindrical bottom portion depending from the flaring top portion and provided with a discharge opening, a shaft extending longitudinally through the hopper at the junction point of its top and bottom portions and above the axial center of the latter, and a valve secured to and projecting beyond opposite sides of such shaft and adapted when disposed horizontally to partition and close the hopper in the plane of the junction of the upper and lower portions.

13. In a machine of the character described, a framework, scale-beams pivoted thereon and linked together, a hopper provided with a discharge opening, a valve for said hopper and linked to the scale-beams, a frame suspended from the scale-beams, a second frame supported by the first-named frame, a poise-carrier pivoted to the first-named frame, and a link pivotally connected at its upper end and movable with the first-named scale-beams and having a pin and slot connection at its lower end with the pivoted poise-carrier.

14. In a machine of the character described, a framework, scale-beams pivoted thereon, a frame suspended from the scale-beams, a second frame supported by the first-named frame platforms suspended from the second frame, a poise-carrier pivoted to the second frame, and a link pivoted at its upper end to the inner end of one of the first-named scale-beams and having a pin and slot connection at its lower end with the poise carrier pivoted to the first-named frame.

In testimony whereof I affix my signature, in the presence of two witnesses.

MONROE DAVIS.

Witnesses:
 O. W. HUTCHISON,
 O. W. HUTCHISON, Jr.